United States Patent
Oh et al.

(10) Patent No.: US 10,402,102 B2
(45) Date of Patent: Sep. 3, 2019

(54) MEMORY SYSTEM AND OPERATING METHOD THEREOF

(71) Applicant: SK hynix Inc., Gyeonggi-do (KR)

(72) Inventors: Ik-Sung Oh, Gyeonggi-do (KR); Jin-Woong Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 15/803,374

(22) Filed: Nov. 3, 2017

(65) Prior Publication Data
US 2018/0285256 A1 Oct. 4, 2018

(30) Foreign Application Priority Data
Mar. 31, 2017 (KR) .................. 10-2017-0041689

(51) Int. Cl.
*G06F 3/06* (2006.01)
*G06F 12/02* (2006.01)

(52) U.S. Cl.
CPC ............ *G06F 3/0613* (2013.01); *G06F 3/064* (2013.01); *G06F 3/0631* (2013.01); *G06F 3/0656* (2013.01); *G06F 3/0685* (2013.01); *G06F 12/0246* (2013.01); *G06F 2212/7205* (2013.01)

(58) Field of Classification Search
None
See application file for complete search history.

(56) References Cited

U.S. PATENT DOCUMENTS

| | | | |
|---|---|---|---|
| 9,229,854 B1 * | 1/2016 | Kuzmin | G06F 8/654 |
| 2001/0013087 A1 * | 8/2001 | Ronstrom | G06F 12/122 |
| | | | 711/133 |
| 2005/0114592 A1 * | 5/2005 | Jin | G06F 3/0611 |
| | | | 711/113 |
| 2006/0179212 A1 * | 8/2006 | Kim | G06F 12/0246 |
| | | | 711/103 |
| 2010/0146193 A1 * | 6/2010 | Jang | G06F 12/0804 |
| | | | 711/103 |

(Continued)

FOREIGN PATENT DOCUMENTS

| | | |
|---|---|---|
| KR | 1020150015764 | 2/2015 |
| KR | 1020150116008 | 10/2015 |

OTHER PUBLICATIONS

Analytic Modeling of SSD Write Performance by Desnoyers (Year: 2012).*

(Continued)

*Primary Examiner* — Reginald G Bragdon
*Assistant Examiner* — Paul M Knight
(74) *Attorney, Agent, or Firm* — IP & T Group LLP

(57) ABSTRACT

A memory system includes: a memory device including a plurality of memory blocks for storing data; a controller memory including a read data area for storing first data, which is read from a victim memory block among the plurality of memory blocks, and a write data area for storing second data, which is to be written into a target memory block among the plurality of memory blocks; and a controller suitable for reading the first data from the read data area, storing the first data into a host memory, and, when the first data stored in the host memory satisfies a predetermined condition, reading the first data from the host memory and storing the first data into the write data area.

12 Claims, 6 Drawing Sheets

(56) References Cited

U.S. PATENT DOCUMENTS

| | | | | |
|---|---|---|---|---|
| 2012/0054421 A1* | 3/2012 | Hiratsuka | ............ | G06F 12/0246 711/103 |
| 2013/0114354 A1* | 5/2013 | Ryu | .................... | G11C 11/5628 365/189.011 |
| 2013/0227207 A1* | 8/2013 | Katz | .................... | G06F 12/0246 711/103 |
| 2014/0059294 A1* | 2/2014 | Naruse | .................. | G06F 3/0689 711/114 |
| 2014/0189209 A1* | 7/2014 | Sinclair | ............... | G06F 12/0246 711/103 |
| 2015/0134887 A1* | 5/2015 | Liang | .................. | G06F 12/0246 711/103 |
| 2015/0212752 A1* | 7/2015 | Nemazie | ............... | G06F 11/108 711/103 |
| 2016/0026406 A1 | 1/2016 | Hahn et al. | | |
| 2016/0179386 A1* | 6/2016 | Zhang | .................... | G06F 3/0679 711/103 |
| 2016/0179430 A1* | 6/2016 | Kong | .................... | G06F 3/0631 711/102 |
| 2016/0188455 A1* | 6/2016 | Patel | .................... | G06F 12/0246 711/154 |
| 2016/0253259 A1* | 9/2016 | Jin | ....................... | G06F 12/1054 711/122 |
| 2017/0242583 A1* | 8/2017 | Yang | ....................... | G06F 3/061 |
| 2017/0308464 A1* | 10/2017 | Hwang | ................ | G06F 3/0604 |
| 2017/0351433 A1* | 12/2017 | Walker | .................. | G06F 3/0605 |
| 2018/0190329 A1* | 7/2018 | Kathawala | ............... | G11C 7/04 |

OTHER PUBLICATIONS

Analysis of the d-choices garbage collection algorithm with memory in flash-based SSDs by Houdt (Year: 2013).*

Optimizing Index Scans on Flash Memory SSDs by Lee (Year: 2011).*

Real-time Flash Memory Storage with Janus-FTL by Lee (Year: 2012).*

How Many MLCs Should Impersonate SLCs to Optimize SSD Performance? by Wang (Year: 2016).*

SFS: Random Write Considered Harmful in Solid State Drives by Min (Year: 2012).*

StableBuffer: Optimizing Write Performance for DBMS Applications on Flash Devices by Li (Year: 2010).*

* cited by examiner

MEMORY SYSTEM AND OPERATING METHOD THEREOF

CROSS-REFERENCE TO RELATED APPLICATIONS

The present application claims priority of Korean Patent Application No. 10-2017-0041689, filed on Mar. 31, 2017, which is incorporated herein by reference in its entirety.

BACKGROUND

1. Field

Exemplary embodiments of the present invention relate to a memory system and an operating method thereof.

2. Description of the Related Art

The computer environment paradigm has changed to ubiquitous computing systems that can be used anytime and anywhere. Due to this fact, use of portable electronic devices such as mobile phones, digital cameras, and notebook computers has rapidly increased. These portable electronic devices generally use a memory system having one or more memory devices for storing data. A memory system may be used as a main memory device or an auxiliary memory device of a portable electronic device.

Memory systems provide excellent stability, durability, high information access speed, and low power consumption since they have no moving parts. Examples of memory systems having such advantages include universal serial bus (USB) memory devices, memory cards having various interfaces, and solid state drives (SSD).

SUMMARY

Various embodiments are directed to a memory system with minimized complexity, performance degradation and maximized use efficiency, and capable of promptly and stably processing data for a memory device, and an operating method thereof.

In an exemplary embodiment of the present invention, a memory system may include: a memory device including a plurality of memory blocks for storing data; a controller memory including a read data for storing first data, which is read from a victim memory block among the plurality of memory blocks, a write data area for storing second data, which is to be written into a target memory block among the plurality of memory blocks; and a controller suitable for reading the first data from the read data area, storing the first data into a host memory, and, when the first data stored in the host memory satisfies a predetermined condition, reading the first data from the host memory and storing the first data into the write data area.

The controller may be suitable for determining that the first data stored in the host memory as satisfying the predetermined condition, when the first data stored in the host memory has a greater size than a predetermined size.

The controller may be suitable for storing the first data, which is read from the victim memory block, into one of first and second data areas of the host memory based on meta-information of the first read data.

When the first data stored in the first data area has a greater size than the predetermined size, the controller may be suitable for reading the first data from the first data area and storing the first read data into the write data area of the controller memory.

When the first data stored in the second data area has a greater size than the predetermined size, the controller may be suitable for reading the first data from the second data area and storing the first read data into the write data area of the controller memory.

The meta-information may include information whether or not the first data read from the victim memory block is hot data or cold data, the controller may be suitable for storing the first data, which is read from the victim memory block, into the first data area when the first data, which is read from the victim memory block, is hot data, and the controller may be suitable for storing the first data, which is read from the victim memory block, into the second data area when the first data, which is read from the victim memory block, is cold data.

The meta-information may include information on whether the first data read from the victim memory block is random data or sequential data, the controller may be suitable for storing the first data, which is read from the victim memory block, into the first data area when the first data, which is read from the victim memory block, is sequential data, and the controller may be suitable for storing the first data, which is read from the victim memory block, into the second data area when the first data, which is read from the victim memory block, is random data.

The predetermined size may be a data size for a program operation.

The first data read from the victim memory block may be valid data.

The controller may be suitable for selecting the memory block that has a smaller number of valid pages than the other memory blocks as the victim memory block.

In an exemplary embodiment of the present invention, an operating method of a memory system may include: storing data, which is read first data from a victim memory block among a plurality of memory blocks of the memory device, into a read data area of a controller memory; the first data from the read data area, and storing the first data read from the read data area into a host memory; when the first data stored in the host memory satisfies a predetermined condition, reading the first data from the host memory and storing the first data which are read from the host memory into the write data area; and storing the first data, which is stored in the write data area, into a target memory block of the memory device.

The storing of the first data which are read from the host memory into the write data area may be performed when the first data stored in the host memory has a greater size than a predetermined size.

The storing of the first data read from the read data area into the host memory may include storing the first data, which is read from the victim memory block, into one of first and second data areas of the host memory based on meta-information of the first data.

The storing of the first data which are read from the host memory into the write data area may include, when first data stored in the first data area has a greater size than the predetermined size, reading the first data from the first data area and storing the first data read from the first data area into the write data area of the controller memory.

The storing of the first data which are read from the host memory into the write data area may include, when first data stored in the second data area has a greater size than the predetermined size, reading the first data from the first data area and storing the first data read from the first data area into the write data area of the controller memory.

The meta-information may include information whether or not the first data read from the victim memory block is hot data or cold data, and the storing of the first data from the victim memory block into the write data area may include: storing the first data, which is read from the victim memory block, into the first data area when the first data, which is read from the victim memory block, is hot data; and storing the first data, which is read from the victim memory block, into the second data area when the first data, which is read from the victim memory block, is cold data.

The meta-information may include information whether the first data read from the victim memory block is random data or sequential data, and the storing of the first data read from the host memory into the write data area may include: storing the first data, which is read from the victim memory block, into the first data area when the first data, which is read from the victim memory block, is sequential data; and storing the first data, which is read from the victim memory block, into the second data area when the first data, which is read from the victim memory block, is random data.

The predetermined size may be a data size for a program operation.

The first data read from the victim memory block may be a valid data.

The victim memory block may have a smaller number of valid pages than the other memory blocks.

In accordance with various embodiments of the present invention, complexity and performance degradation of a memory system may be minimized, use efficiency of the memory system may be maximized, and data for a memory device of the memory system may be promptly and stably processed.

BRIEF DESCRIPTION OF THE DRAWINGS

These and other features and advantages of the present invention will become apparent to those skilled in the art to which the present invention pertains from the following detailed description in reference to the accompanying drawings.

DETAILED DESCRIPTION

Figure 1:
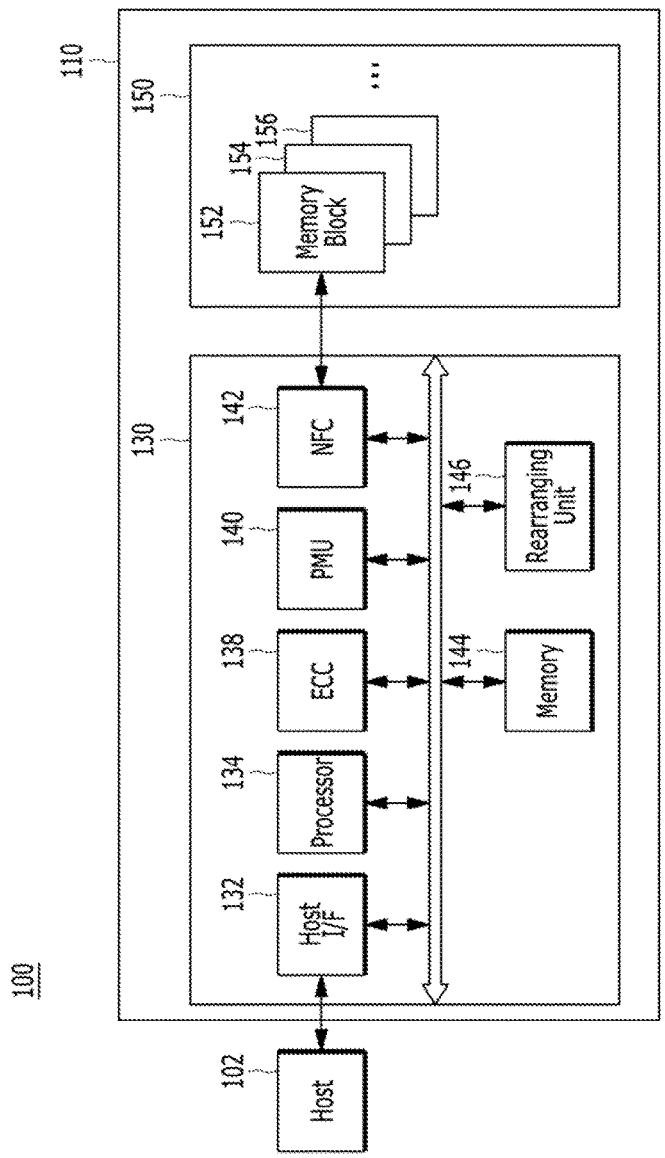
FIG. 1 is a block diagram illustrating a data processing system in accordance with an embodiment of the present invention.

Various embodiments of the present invention are described below in more detail with reference to the accompanying drawings. We note, however, that the present invention may be embodied in different other embodiments, forms and variations thereof and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention.

As used herein, singular forms are intended to include the plural forms as well, unless the context clearly indicates otherwise.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a data processing system 100 in accordance with an embodiment of the present invention.

Referring to FIG. 1, the data processing system 100 may include a host 102 operatively coupled to a memory system 110.

The host 102 may include portable electronic devices such as a mobile phone, MP3 player and laptop computer or non-portable electronic devices such as a desktop computer, game machine, TV and projector.

The memory system 110 may operate to store data for the host 102 in response to a request of the host 102. Non-limited examples of the memory system 110 may include a solid state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC, and the. The SD card may include a mini-SD card and micro-SD card.

The memory system 110 may be embodied by various types of storage devices. Non-limited examples of storage devices included in the memory system 110 may include volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM) and a flash memory. The flash memory may have a 3-dimensional (3D) stack structure.

The memory system 110 may include a memory device 150 and a controller 130. The memory device 150 may store data for the host 120, and the controller 130 may control data storage into the memory device 150.

The controller 130 and the memory device 150 may be integrated into a single semiconductor device, which may be included in the various types of memory systems as exemplified above. For example, the controller 130 and the memory device 150 may be integrated as one semiconductor device to constitute an SSD. When the memory system 110 is used as an SSD, the operating speed of the host 102 connected to the memory system 110 can be improved. In addition, the controller 130 and the memory device 150 may be integrated as one semiconductor device to constitute a memory card. For example, the controller 130 and the memory device 150 may constitute a memory card such as a PCMCIA (personal computer memory card international association) card, CF card, SMC (smart media card), memory stick, MMC including RS-MMC and micro-MMC, SD card including mini-SD, micro-SD and SDHC, or UFS device.

Non-limited application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host 102 through a write operation, and provide data stored therein to the host 102 through a read operation. The memory device 150 may include a plurality of memory blocks 152 to 156, each of the memory blocks 152 to 156 may include a plurality of pages, and each of the pages may include a plurality of memory cells coupled to a word line.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program and erase operations of the memory device 150.

The controller 130 may include a host interface (I/F) unit 132, a controller processor 134, an error correction code (ECC) unit 138, a Power Management Unit (PMU) 140, a NAND flash controller (NFC) 142 and a controller memory 144 all operatively coupled via an internal bus.

The host interface unit 134 may be configured to process a command and data of the host 102, and may communicate with the host 102 through one or more of various interface protocols such as universal serial bus (USB), multi-media card (MMC), peripheral component interconnect-express (PCI-E), small computer system interface (SCSI), serial-attached SCSI (SAS), serial advanced technology attachment (SATA), parallel advanced technology attachment (PATA), enhanced small disk interface (ESDI) and integrated drive electronics (IDE).

The ECC unit 138 may detect and correct an error contained in the data read from the memory device 150. In other words, the ECC unit 138 may perform an error correction decoding process to the data read from the memory device 150 through an ECC code used during an ECC encoding process. According to a result of the error correction decoding process, the ECC unit 138 may output a signal, for example, an error correction success/fail signal. When the number of error bits is more than a threshold value of correctable error bits, the ECC unit 138 may not correct the error bits, and may output an error correction fall signal.

The ECC unit 138 may perform error correction through a coded modulation such as Low Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the ECC unit 138 is not limited thereto. The ECC unit 138 may include all circuits, modules, systems or devices for error correction.

The PMU 140 may provide and manage power of the controller 130.

The NFC 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the NFC 142 may generate a control signal for the memory device 150 and process data to be provided to the memory device 150 under the control of the controller processor 134. The NFC 142 may work as an interface (e.g., a NAND flash interface) for processing a command and data between the controller 130 and the memory device 150. Specifically, the NFC 142 may support data transfer between the controller 130 and the memory device 150.

The controller memory 144 may serve as a working memory of the memory system 110 and the controller 130, and store data for driving the memory system 110 and the controller 130. The controller 130 may control the memory device 150 to perform read, write, program and erase operations in response to a request from the host 102. The controller 130 may provide data read from the memory device 150 to the host 102, may store data provided from the host 102 into the memory device 150. The controller memory 144 may store data required for the controller 130 and the memory device 150 to perform these operations.

The controller memory 144 may be embodied by a volatile memory. For example, the controller memory 144 may be embodied by static random access memory (SRAM) or dynamic random access memory (DRAM). The controller memory 144 may be disposed within or out of the controller 130. FIG. 1 exemplifies the controller memory 144 disposed within the controller 130. In an embodiment, the controller memory 144 may be embodied by an external volatile memory having a memory interface transferring data between the controller memory 144 and the controller 130.

The controller processor 134 may control the overall operations of the memory system 110. The controller processor 134 may drive firmware to control the overall operations of the memory system 110. The firmware may be referred to as flash translation layer (FTL).

The controller processor 134 of the controller 130 may include a management unit (not illustrated) for performing a bad management operation of the memory device 150. The management unit may perform a bad block management operation of checking a bad block, in which a program fail occurs due to the characteristic of a NAND flash memory during a program operation, among the plurality of memory blocks 152 to 156 included in the memory device 150. The management unit may write the program-failed data of the bad block to a new memory block. In the memory device 150 having a 3D stack structure, the bad block management operation may reduce the use efficiency of the memory device 150 and the reliability of the memory system 110. Thus, the bad block management operation needs to be performed with more reliability.

Figure 2:
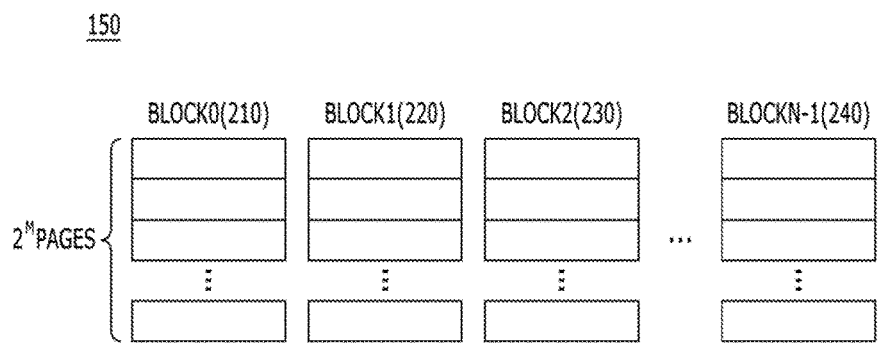
FIG. 2 is a schematic diagram illustrating an exemplary configuration of a memory device employed in a memory system of FIG. 1.

FIG. 2 is a schematic diagram illustrating an exemplary configuration of the memory device 150.

Referring to FIG. 2, the memory device 150 may include a plurality of memory blocks BLOCK 0 to BLOCK N−1, and each of the blocks 0 to N−1 may include a plurality of pages, for example, $2^M$ pages, the number of which may vary according to circuit design. Memory cells included in the respective memory blocks 0 to N−1 may be one or more of a single level cell (SLC) storing 1-bit data, a multi-level cell (MLC) storing 2-bit data, a triple level cell (TLC) storing 3-bit data, a quadruple level cell (QLC) storing 4-bit level cell, a multiple level cell storing 5-or-more-bit data, and so forth.

Figure 3:
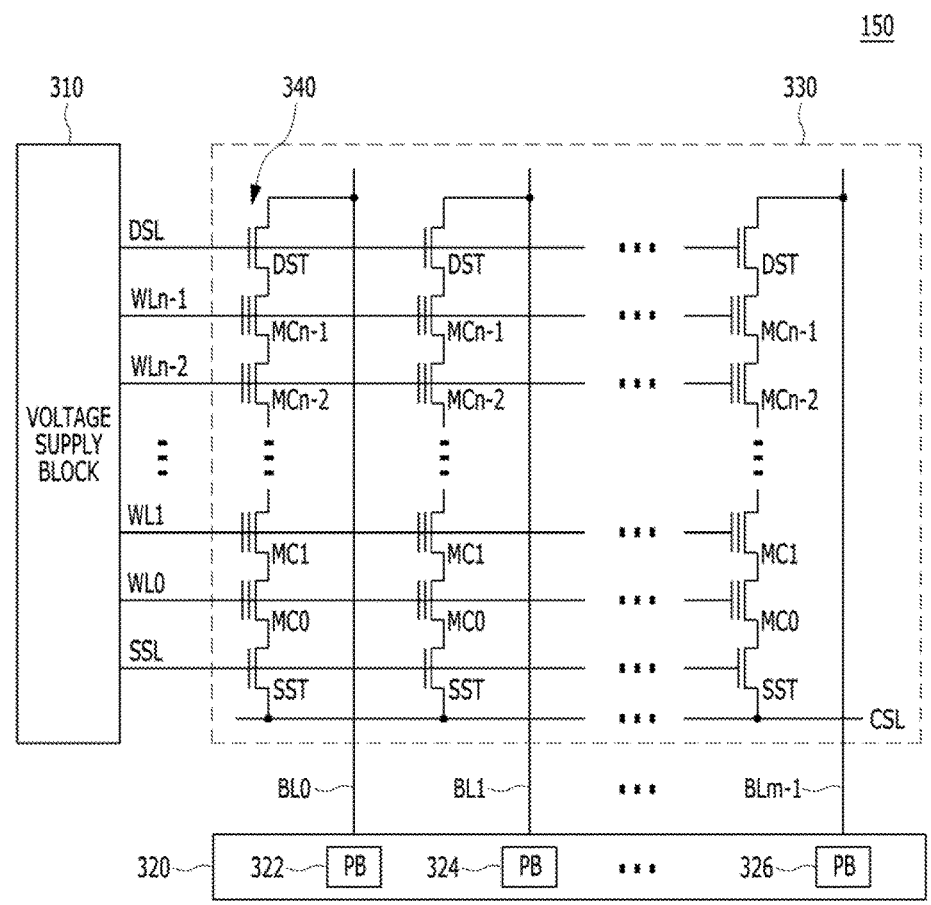
FIG. 3 is a circuit diagram illustrating an exemplary configuration of a memory cell array of a memory block in a memory device shown in FIG. 1.

FIG. 3 is a circuit diagram illustrating an exemplary configuration of a memory cell array of a memory block in the memory device 150.

Referring to FIG. 3, a memory block 330 which may correspond to any of the plurality of memory blocks 152 to 156 of the memory system 110 may include a plurality of cell strings 340 coupled to a plurality of corresponding bit lines BL0 to BLm−1. The cell string 340 of each column may include one or more drain select transistors DST and one or more source select transistors SST. Between the drain and source select transistors DST and SST, a plurality of memory cells MC0 to MCn−1 may be coupled in series. In an embodiment, each of the memory cell transistors MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as illustrated in FIG. 3, the first cell string is coupled to the first bit line BL0, and the last cell string is coupled to the last bit line BLm−1.

Although FIG. 3 illustrates NAND flash memory cells, the invention is not limited in this way. It is noted that the memory cells may be NOR flash memory cells, or hybrid flash memory cells including two or more kinds of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply unit 310 which provides word line voltages including a program voltage, a read voltage and a pass voltage to supply to the word lines according to an operation mode. The voltage generation operation of the voltage supply unit 310 may be controlled by a control circuit (not illustrated). Under the control of the control circuit, the voltage supply unit 310 may select one of the memory blocks (or sectors) of the memory cell array, select one of the word lines of the selected memory block, and provide the word line voltages to the selected word line and the unselected word lines.

The memory device 150 may include a read/write circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

Figure 4:
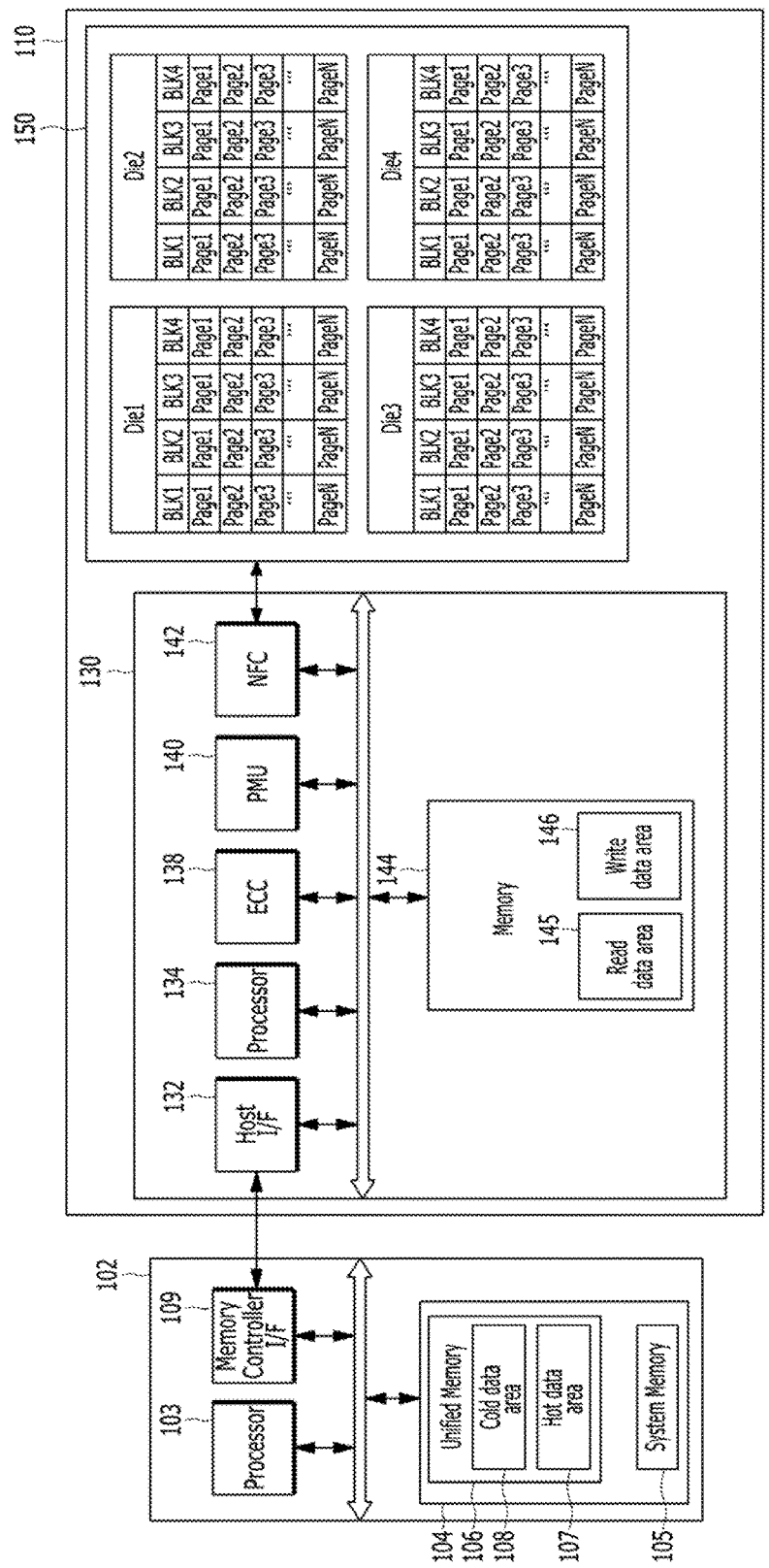
FIG. 4 is a block diagram illustrating a data processing system in accordance with an embodiment of the present invention.

FIG. 4 is a block diagram illustrating the data processing system 100 in accordance with an embodiment of the present invention.

Referring to FIG. 4, the data processing system 100 may include the host 102 operatively coupled to the memory system 110 and the memory system 110 may include the controller 130 and the memory device 150, as described above.

The host 102 may include a host processor 103 and a host memory 104. The host processor 103 may control the host 102 and the host memory 104 may store data for an operation of the host processor 103.

The host 102 may communicate with the memory system 110 through a memory controller interface 109. The memory controller interface 109 may be configured to process a command and data of the host 102, and may communicate with the memory system 110 through one or more of various interface protocols such as the universal serial bus (USB), the multi-media card (MMC), the peripheral component interconnect-express (PCI-E), the small computer system interface (SCSI), the serial-attached SCSI (SAS), the serial advanced technology attachment (SATA), the parallel the advanced technology attachment (PATA), the enhanced small disk interface (ESDI) and the integrated drive electronics (IDE).

The host processor 103 may store data corresponding to a write command into the host memory 104 by providing the host memory 104 with the write command and the corresponding data. The host processor 103 may read data corresponding to a read command from the host memory 104 by providing the host memory 104 with the read command.

The host memory 104 may include a system memory 105 and a unified memory 106. The system memory 105 may store data and program information related to an operation of the host 102 such as a file system and an operating system.

The unified memory 106 may serve as storage where the host processor 103 stores data and read data stored therein in response to a request from the memory system 110. Communication between the host 102 and the memory system 110 in order to store data into and read stored data from the unified memory 106 may be performed through existing channel between the memory controller interface 109 and the host interface 132.

The controller processor 134 of the memory system 110 may store data corresponding to a write command, which is provided from the host 102, into the memory device 150 by providing the memory device 150 with the write command and the corresponding data. The controller processor 134 may read data corresponding to a read command, which is provided from the host 102, from the memory device 150 by providing the memory device 150 with the read command.

The controller processor 134 may store data corresponding to a write command, which is provided from the host 102, into a write data area 146 of the controller memory 144 by providing the controller memory 144 with the write command and the corresponding data. The controller processor 134 may read data corresponding to a read command, which is provided from the host 102, from a read data area 145 of the controller memory 144 by providing the controller memory 144 with the read command.

For a foreground operation, the controller processor 134 may write data into the controller memory 144 in response to a write command from the host 102 and may read data from the controller memory 144 in response to a read command from the host 102. The controller 130 may perform the foreground operation in response to a command from the host 102.

For a background operation, the controller processor 134 may write data into the controller memory 144 and may read data from the controller memory 144 without a command from the host 102. Non-limited examples of the background operation may include a garbage collection operation of copying data of a memory block into another memory block in the memory device 150, a wear leveling operation of swapping data of memory blocks in the memory device 150, and a map flush operation of storing data of the controller memory 144 into memory blocks of the memory device 150.

During a background operation, the controller processor 134 may store data of the controller memory 144 into the host memory 104. Particularly, the controller processor 134 may provide the host 102 with a write request and corresponding data, which is stored in the read data area 145 of the controller memory 144, and the host 102 may store the provided data into the unified memory 106 of the host memory 104 in response to the write request from the controller processor 134. Also, during a background operation, the controller processor 134 may store data of the host memory 104 into the controller memory 144. Particularly, in response to a write command along with data, which is stored in the host memory 104, from the host 102, the controller processor 134 may store the provided data into the write data area 146 of the controller memory 144.

For storing data of the read data area 145 of the controller memory 144 into the unified memory 106 of the host memory 104, the controller processor 134 may have meta-information for classifying data, which is stored in the controller memory 144, according to types of the data. The meta-information may include information whether or not the data stored in the controller memory 144 is hot data or cold data. As exemplified in FIG. 4, the controller processor 134 may classify data, which is stored in the read data area 145, into hot data and cold data based on the meta-information of the data of the read data area 145. The controller processor 134 may store the hot data into a hot data area 107 of the unified memory 106, and may store the cold data into a cold data area 108 of the unified memory 106. When data of the read data area 145 is stored into the unified memory 106, the data may be deleted or discarded from the read data area 145. Accordingly, the controller processor 134 may secure available storage space of the read data area 145.

Also, the controller processor 134 may classify the data, which is stored in the read data area 145, into random data and sequential data based on the meta-information of the data of the read data area 145. The meta-information may further include information whether the data stored in the controller memory 144 is random data or sequential data. The controller processor 134 may store the random data into a random data area (not illustrated) of the unified memory 106 while storing the sequential data into a sequential data area (not illustrated) of the unified memory 106.

In an embodiment, the hot data and cold data may be identified according to a size of the data provided from the host 102. For example, data provided from the host 102 may be classified into the hot data when the provided data has relatively smaller size, and data provided from the host 102 may be classified into the cold data when the provided data has relatively greater size. In another embodiment, the hot data and cold data may be identified according to data access ratio of the host 102. For example, data provided from the host 102 may be classified into the hot data when the provided data has relatively greater access ratio by the host 102, and data provided from the host 102 may be classified into the cold data when the provided data has relatively smaller access ratio by the host 102.

Therefore, after data provided from the host 102 is stored into the memory device 150 as the hot data due to the size thereof, the data classified as the hot data may be changed into the cold data when the access ratio of the data stored in the memory device 150 is relatively small for a predetermined amount of time. In a similar manner, after data provided from the host 102 is stored into the memory device 150 as the cold data due to the size thereof, the data classified as the cold data may be changed into the hot data when the access ratio of the data stored in the memory device 150 is relatively great for a predetermined amount of time.

When data stored in the unified memory 106 satisfies a predetermined condition, the host processor 103 may provide a write request along with the condition-satisfying data to the controller processor 134 of the controller 130.

When data stored in the unified memory 106 has a size greater than a predetermined size, the host processor 103 may determine the stored data as satisfying the predetermined condition. When data stored in the unified memory 106 is related to the background operation (e.g., garbage collection data, wear leveling data, map flush data and so forth), the host processor 103 may determine the stored data as satisfying the predetermined condition. When there is a need to issue a force action (FA) command (e.g., when the system memory 105 of the host memory 104 is running out of available storage space and thus there is a need to change the unified memory 106 into the system memory 105), the host processor 103 may determine data, which is stored in the unified memory 106, as satisfying the predetermined condition.

When data stored in the unified memory 106 has a size greater than a predetermined size, the host processor 103 may determine the stored data as satisfying the predetermined condition. Then, the host processor 103 may notify the controller processor 134 of the controller 130 of storage of the data having the greater size than the predetermined size in the unified memory 106 and may provide the controller processor 134 with a write request along with the stored data having the greater size than the predetermined size.

In an embodiment, when the host 102 and the memory system 110 have a relationship of master and slave and data stored in the unified memory 106 has a size greater than a predetermined size, the host processor 103 may provide the controller processor 134 with a write request along with the stored data having the greater size than the predetermined size without notifying the controller processor 134 of storage of the data having the greater size than the predetermined size in the unified memory 106.

The predetermined size may be a size of data required for a one-shot program. During the one-shot program, data of two or more bits may be programmed into a memory cell. According to the one-shot program operation, when a memory cell is the MLC for example, data of LSB and MSB may be programmed into the memory cell through a single program operation. According to a normal program operation, data of LSB may be programmed into a MLC and then data of MSB may be programmed into the MLC. Therefore, size of data required for the one-shot program may be 32 KB (16 KB*2) when a single page has a size of 16 KB and a memory cell of the page is the MLC, and size of data required for the one-shot program may be 48 KB (16 KB*3) when a single page has a size of 16 KB and a memory cell of the page is the TLC.

When data stored in the unified memory 106 is the garbage collection data, the host processor 103 may determine the stored data as satisfying the predetermined condition. Then, the host processor 103 may notify the controller processor 134 of the controller 130 of storage of the garbage collection data in the unified memory 106 and may provide the controller processor 134 with a write request along with the stored garbage collection data.

When the host 102 and the memory system 110 have a relationship of master and slave and data stored in the unified memory 106 is the garbage collection data, the host processor 103 may provide the controller processor 134 with a write request along with the stored garbage collection data without notifying the controller processor 134 of storage of the garbage collection data in the unified memory 106.

Hereinafter, described with reference to FIGS. 5 to 7 will be an operation that the controller 130 collects data of the memory device 150 into the unified memory 106 and stores the collected data again into the memory device 150 during a background operation (e.g., a garbage collection operation) of the memory system 110.

Figure 5:
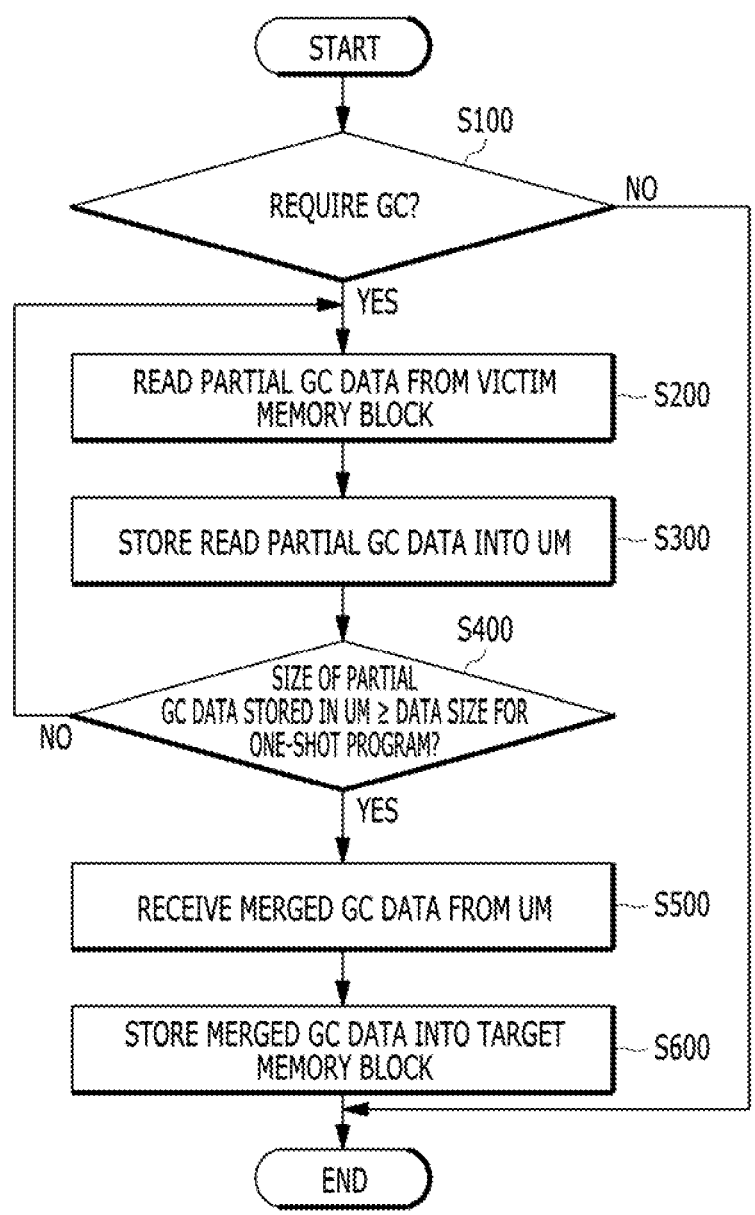
FIG. 5 is a flow chart illustrating an operation of a controller during a garbage collection operation as a background operation.

FIG. 5 is a flow chart illustrating an operation of the controller 130 during a garbage collection operation as a background operation.

Figure 6:
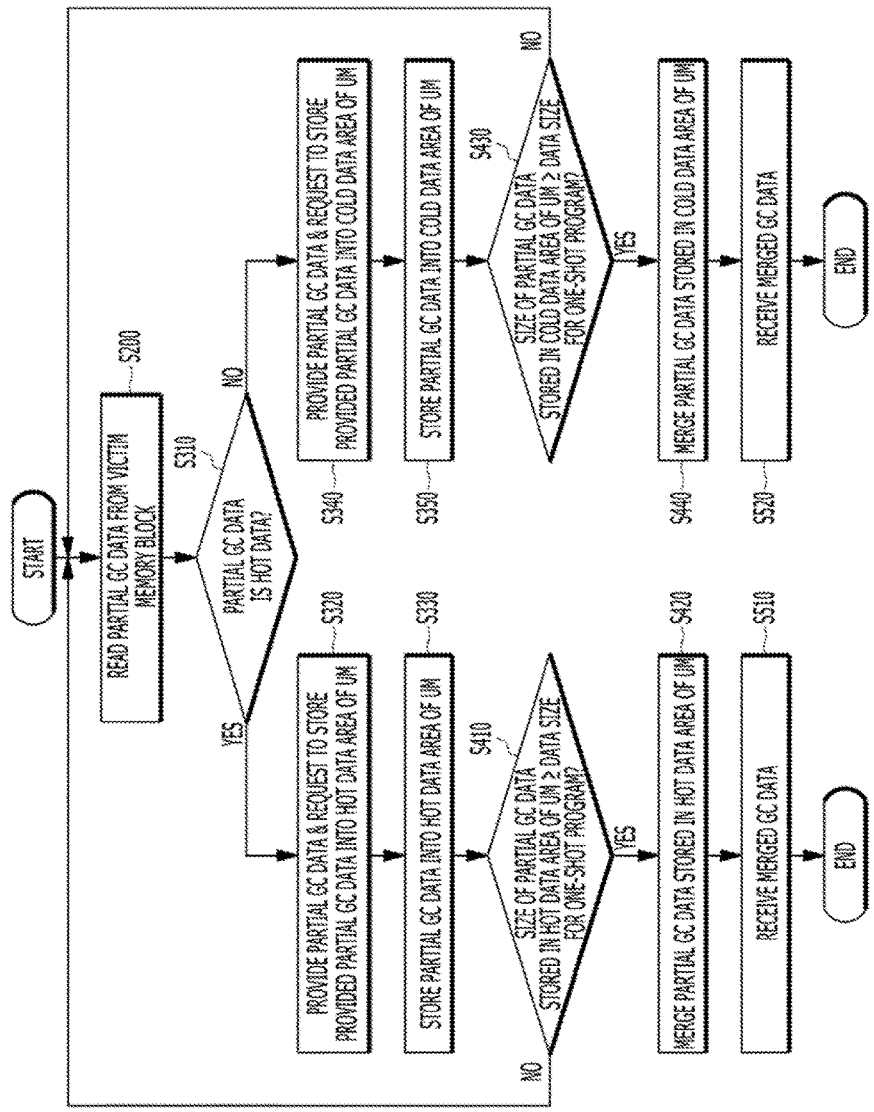
FIGS. 6 and 7 are flow charts illustrating an operation of the controller.
Figure 7:
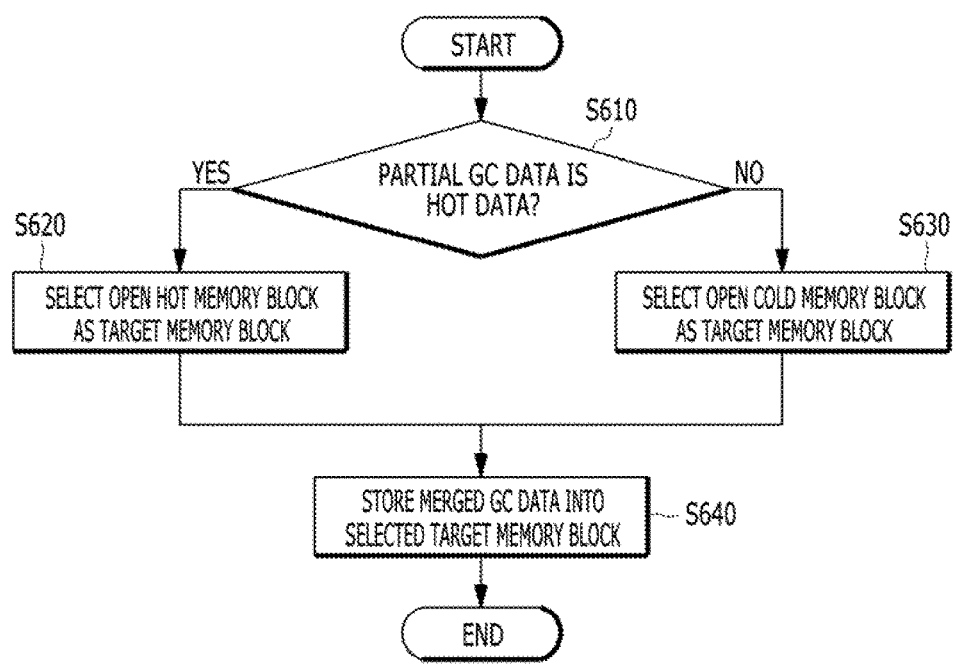

FIGS. 6 and 7 are flow charts illustrating an operation of the controller 130. FIG. 6 shows steps S200 to S500 of FIG. 5. FIG. 7 shows step S600 of FIG. 5.

Referring to FIG. 5, at step S100, the controller processor 134 may determine whether or not a garbage collection operation is required. For example, the controller processor 134 may determine that a garbage collection operation is required when a number of free memory blocks becomes smaller than a predetermined threshold. The free memory block is storing no valid data.

The process may proceed to step S200 when the controller processor 134 determines that a garbage collection operation is required ("YES" at step S100), and may end when the controller processor 134 determines that a garbage collection operation is not required ("NO" at step S100).

At step S200, the controller processor 134 may select a victim one among memory blocks, and may read partial garbage collection data from the selected victim memory block. The controller processor 134 may store the partial garbage collection data, which is read from the victim memory block, into the controller memory 144. The controller processor 134 may select a memory block having the least number of valid pages as a victim memory block among the memory blocks. A valid page is a page storing valid data. For example, when a first memory block BLK1 of a first memory die DIE1 has the least number of valid pages and a second memory block BLK2 of a second memory die DIE2 has the second-least number of valid pages in the memory device 150, the controller processor 134 may select the first memory block BLK1 as a victim memory block. The partial garbage collection data may be valid data and a size thereof may be smaller than a data size for a program operation. The data size for a program operation may be one for a one-shot program operation.

At step S300, the controller processor 134 may store the partial garbage collection data, which is read from the victim memory block, into the unified memory 106 by providing the partial garbage collection data and a corresponding write request to the host processor 103 of the host 102.

Referring to FIG. 6, step S300 may include steps S310 to S350.

At step S310, the controller processor 134 may determine whether or not the partial garbage collection data read from the victim memory block is hot data. The controller processor 134 may determine whether or not the partial garbage collection data is hot data based on the meta-information of the partial garbage collection data.

The process may proceed to step S320 when the controller processor 134 determines that the partial garbage collection data is hot data ("YES" at step S310), and may proceed to step S340 when the controller processor 134 determines that the partial garbage collection data is cold data ("NO" at step S310).

At step S320, the controller processor 134 may provide the host 102 with the partial garbage collection data, which is determined to be hot data, and a corresponding write request requesting storage of the partial garbage collection data into the hot data area 107 of the unified memory (UM) 106.

At step S330, the host processor 103 of the host 102 may store the partial garbage collection data which are received from the controller processor 134 into the hot data area 107 of the unified memory 106 in response to the write request received from the controller processor 134.

At step S340, the controller processor 134 may provide the host 102 with the partial garbage collection data, which is determined to be cold data, and a corresponding write request requesting storage of the partial garbage collection data into the cold data area 108 of the unified memory 106.

At step S350, the host processor 103 of the host 102 may store the partial garbage collection data which are received from the controller processor 134 into the cold data area 108 of the unified memory 106 in response to the write request from the controller processor 134.

Referring back to FIG. 5, at step S400, the host processor 103 may determine whether or not the partial garbage collection data stored in the unified memory 106 has a greater size than a predetermined size. The host processor 103 may notify the controller processor 134 of the determination result. The predetermined size may be a data size for a program operation.

The process may proceed to step S500 when the controller processor 134 determines the partial garbage collection data stored in the unified memory 106 as having a greater size than the predetermined size ("YES" at step S400), and may proceed back to step S200 when the controller processor 134 determines the partial garbage collection data stored in the unified memory 106 as having a smaller size than the predetermined size ("NO" at step S400).

Referring back to FIG. 6, step S400 may include steps S410 to S440.

At step S410, the host processor 103 may determine whether or not the partial garbage collection data stored in the hot data area 107 of the unified memory 106 has a greater size than the predetermined size.

The process may proceed to step S420 when the controller processor 134 determines the partial garbage collection data, which is stored in the hot data area 107 of the unified memory 106, as having a greater size than the predetermined size ("YES" at step S410).

At step S420, the host processor 103 may merge the partial garbage collection data stored in the hot data area 107 of the unified memory 106 and may notify the controller processor 134 of storage of data having a greater size than the predetermined size in the unified memory 106.

The process may proceed back to step S200 when the controller processor 134 determines the partial garbage collection data, which is stored in the hot data area 107 of the unified memory 106, as having a smaller size than the predetermined size ("NO" at step S410). The host processor 103 may notify the controller processor 134 of storage of data having a smaller than the predetermined size in the unified memory 106.

At step S430, the host processor 103 may determine whether or not the partial garbage collection data stored in the cold data area 108 of the unified memory 106 has a greater size than the predetermined size.

The process may proceed to step S440 when the controller processor 134 determines the partial garbage collection data, which is stored in the cold data area 108 of the unified memory 106, as having a greater size than the predetermined size ("YES" at step S430).

At step S440, the host processor 103 may merge the partial garbage collection data stored in the cold data area 108 of the unified memory 106 and may notify the controller processor 134 of storage of data having a greater size than the predetermined size in the unified memory 106.

The process may proceed back to step S200 when the controller processor 134 determines the partial garbage collection data, which is stored in the cold data area 108 of the unified memory 106, as having a smaller size than the predetermined size ("NO" at step S430). The host processor 103 may notify the controller processor 134 of storage of data having a smaller than the predetermined size in the unified memory 106.

Referring back to FIG. 5, at step S500, the controller processor 134 may receive the merged garbage collection data from the unified memory 106. The controller processor 134 may store the merged garbage collection data, which is provided from the unified memory 106, into the write data area 146. The merged garbage collection data may be data, into which the host processor 103 of the host 102 merges the partial garbage collection data stored in the unified memory 106. The merged garbage collection data may have a size for a program operation.

Referring back to FIG. 6, step S500 may include steps S510 and S520.

At step S510, the controller processor 134 may receive the merged garbage collection data from the hot data area 107 of the unified memory 106. The controller processor 134 may store the merged garbage collection data, which is provided from the hot data area 107, into the write data area 146.

At step S520, the controller processor 134 may receive the merged garbage collection data from the cold data area 108 of the unified memory 106. The controller processor 134 may store the merged garbage collection data, which is provided from the cold data area 108, into the write data area 146.

Referring back to FIG. 5, at step S600, the controller processor 134 may store the merged garbage collection data, which is stored in the write data area 146, into a target memory block. The merged garbage collection data may have a size for a program operation.

Referring to FIG. 7, step S600 may include steps S610 to S640.

At step S610, the controller processor 134 may determine whether the merged garbage collection data stored in the write data area 146 is hot data or cold data.

The process may proceed to step S620 when the controller processor 134 determines that the merged garbage collection data stored in the write data area 146 is hot data ("YES" at step S610), and may proceed to step S630 when the controller processor 134 determines that the merged garbage collection data stored in the write data area 146 is cold data ("NO" at step S610).

At step S620, the controller processor 134 may select an open hot memory block as a target memory block.

At step S630, the controller processor 134 may select an open cold memory block as a target memory block.

At step S640, the controller processor 134 may store the merged garbage collection data into the selected target memory block.

As described above, in accordance with an embodiment of the present invention, the memory system 110 may collect data of the memory device 150 into the unified memory 106 and then may store the data back into the memory device 150 thereby virtually enlarging the capacity of a working memory in the memory device 150.

In accordance with an embodiment of the present invention, the controller 130 of the memory system 110 may perform a background operation by using the existing read data area and write data area without allocating a part of the controller memory 144 as an area for the background operation. Accordingly, the memory system may reduce the latency occurring when allocating a part of the controller memory 144.

In accordance with an embodiment of the present invention, the memory system 110 may perform a background operation by using the read data area and write data area, sizes of which are greater than a size of an area for the background operation. Accordingly, the system may reduce the latency required when performing a background operation.

While the present invention has been described with respect to specific embodiments, it will be apparent to those skilled in the art that various changes and modifications may be made without departing from the spirit and scope of the invention as defined in the following claims.

What is claimed is:

1. A memory system comprising:
    a memory device including a plurality of memory blocks for storing data;
    a controller memory including:
    a read data area for storing first data, which is read from a victim memory block among the plurality of memory blocks, and
    a write data area for storing second data, which is to be written into a target memory block among the plurality of memory blocks; and
    a controller suitable for:
    reading the first data from the read data area,
    storing the first data into one of first and second data areas of a host memory based on meta-information of the read first data, and,
    when the first data stored in the host memory has a greater size than a predetermined size, reading the first data from the host memory and storing the first data into the write data area,
    wherein the meta-information includes information on whether the first data read from the victim memory block is random data or sequential data,
    wherein the controller is suitable for storing the first data, which is read from the victim memory block, into the first data area when the first data, which is read from the victim memory block, is sequential data, and
    wherein the controller is suitable for storing the first data, which is read from the victim memory block, into the second data area when the first data, which is read from the victim memory block, is random data.

2. The memory system of claim 1, wherein, when the first data stored in the first data area has a greater size than the predetermined size, the controller is suitable for reading the first data from the first data area and storing the read first data into the write data area of the controller memory.

3. The memory system of claim 1, wherein, when the first data stored in the second data area has a greater size than the predetermined size, the controller is suitable for reading the first data from the second data area and storing the read first data into the write data area of the controller memory.

4. The memory system of claim 1, wherein the predetermined size is a data size for a program operation.

5. The memory system of claim 1, wherein the first data read from the victim memory block is valid data.

6. The memory system of claim 1, wherein the controller is suitable for selecting the memory block that has a smaller number of valid pages than the other memory blocks as the victim memory block.

7. An operating method of a memory system, the operating method comprising:
    storing data, which is read first data from a victim memory block among a plurality of memory blocks of a memory device, into a read data area of a controller memory;
    reading the first data from the read data area, and storing the first data read from the read data area into one of first and second data areas of a host memory based on meta-information of the first data;
    when the first data stored in the host memory has a greater size than a predetermined size, reading the first data from the host memory and storing the first data which are read from the host memory into a write data area; and
    storing the first data which is stored in the write data area into a target memory block of the memory device,
    wherein the meta-information includes information whether the first data read from the victim memory block is random data or sequential data, and
    wherein the storing of the first data read from the host memory into the write data area includes:
    storing the first data which is read from the victim memory block into the first data area when the first data which is read from the victim memory block is sequential data; and
    storing the first data which is read from the victim memory block into the second data area when the first data which is read from the victim memory block is random data.

8. The operating method of claim 7, wherein the storing of the first data which are read from the host memory into the write data area includes, when first data stored in the first data area has a greater size than the predetermined size, reading the first data from the first data area and storing the first data read from the first data area into the write data area of the controller memory.

9. The operating method of claim 7, wherein the storing of the first data which are read from the host memory into the write data area includes, when first data stored in the second data area has a greater size than the predetermined size, reading the first data from the second data area and storing the first data read from second data area into the write data area of the controller memory.

10. The operating method of claim 7, wherein the predetermined size is a data size for a program operation.

11. The operating method of claim 7, wherein the first data read from the victim memory block is a valid data.

12. The operating method of claim 7, wherein the victim memory block has a smaller number of valid pages than the other memory blocks.

* * * * *